United States Patent
Kosugi et al.

(10) Patent No.: US 12,086,628 B2
(45) Date of Patent: Sep. 10, 2024

(54) ELECTRONIC APPARATUS AND CONTROL METHOD

(71) Applicant: Lenovo (Singapore) Pte. Ltd., Singapore (SG)

(72) Inventors: Kazuhiro Kosugi, Kanagawa (JP); Masashi Nishio, Kanagawa (JP); Eri Shimizu, Kanagawa (JP)

(73) Assignee: Lenovo (Singapore) Pte. Ltd., Republic of (SG)

( * ) Notice: Subject to any disclaimer, the term of this patent is extended or adjusted under 35 U.S.C. 154(b) by 71 days.

(21) Appl. No.: 17/938,330

(22) Filed: Oct. 6, 2022

(65) Prior Publication Data
US 2023/0176897 A1 Jun. 8, 2023

(30) Foreign Application Priority Data

Dec. 8, 2021 (JP) ................................. 2021-199297

(51) Int. Cl.
| | |
|---|---|
| *G06F 1/26* | (2006.01) |
| *G06F 9/48* | (2006.01) |
| *G06F 11/34* | (2006.01) |
| *G06V 40/16* | (2022.01) |
| *G06F 1/3203* | (2019.01) |

(52) U.S. Cl.
CPC ............ *G06F 9/48* (2013.01); *G06F 11/3438* (2013.01); *G06V 40/161* (2022.01); *G06F 1/3203* (2013.01)

(58) Field of Classification Search
CPC ...... G06F 9/48; G06F 11/3438; G06F 1/3231; G06F 1/1686; G06F 1/3246; G06F 1/3234; G06V 40/161; G06V 40/18
USPC ............................................................ 713/300
See application file for complete search history.

(56) References Cited

U.S. PATENT DOCUMENTS

| | | | | |
|---|---|---|---|---|
| 2011/0316840 A1* | 12/2011 | Hirata | .................. | G06F 1/3265 345/211 |
| 2013/0229399 A1* | 9/2013 | Yokota | ..................... | G09G 5/00 345/211 |
| 2013/0342672 A1* | 12/2013 | Gray | ..................... | H04W 12/06 348/78 |

(Continued)

FOREIGN PATENT DOCUMENTS

| | | |
|---|---|---|
| JP | H11-288259 A | 10/1999 |
| JP | 2001-005550 A | 1/2001 |

(Continued)

*Primary Examiner* — Volvick Derose
(74) *Attorney, Agent, or Firm* — Osha Bergman Watanabe & Burton LLP

(57) ABSTRACT

An electronic apparatus includes: a memory which temporarily stores a program of a system; a first processor which executes the program to implement functions of the system; a second processor which detects a face area with a face captured therein from an image captured by an imaging unit; and a third processor which switches between and executes first processing in which, when the face area is detected by the second processor, first information is output, while when the face area is not detected, second information is output, and second processing to output the first information despite detection of the face area by the second processor. When there is no operation input by a user over a certain period of time, the first processor restricts use of at least some of the functions of the system.

8 Claims, 8 Drawing Sheets

(56) References Cited

U.S. PATENT DOCUMENTS

| | | | | |
|---|---|---|---|---|
| 2014/0208145 A1* | 7/2014 | Piccolotto | ............... | G09G 3/20 |
| | | | | 713/324 |
| 2014/0267034 A1* | 9/2014 | Krulce | .................... | G06F 21/32 |
| | | | | 345/158 |
| 2017/0063758 A1* | 3/2017 | Gao | ...................... | H04L 51/214 |
| 2020/0336788 A1* | 10/2020 | Kosugi | ................. | H04H 60/33 |
| 2020/0379511 A1* | 12/2020 | Jin | .......................... | H04L 12/00 |
| 2022/0269800 A1* | 8/2022 | Cui | .................. | H04M 1/72463 |

FOREIGN PATENT DOCUMENTS

| | | | |
|---|---|---|---|
| JP | 2010-205054 | A | 9/2010 |
| JP | 2013-182526 | A | 9/2013 |
| JP | 2016-517087 | A | 6/2016 |
| JP | 2016-148895 | A | 8/2016 |
| JP | 2018-041477 | A | 3/2018 |

\* cited by examiner

ELECTRONIC APPARATUS AND CONTROL METHOD

CROSS-REFERENCE TO RELATED APPLICATIONS

This application claims priority to Japanese Patent Application No. 2021-199297 filed on Dec. 8, 2021, the contents of which are hereby incorporated herein by reference in their entirety.

TECHNICAL FIELD

The present invention relates to an electronic apparatus and a control method.

BACKGROUND

There is an electronic apparatus which makes a transition to a usable operating state when a person approaches or to a standby state in which functions except some of the functions are stopped when the person leaves. For example, in Japanese Unexamined Patent Application Publication No. 2016-148895, a technique for controlling the operating state of an electronic apparatus by using an infrared sensor to detect the intensity of infrared light in order to detect whether a person is approaching or a person has left is disclosed.

In recent years, with the development of computer vision and the like, the detection accuracy when detecting a face from an image has been getting higher. Therefore, face detection is beginning to be used instead of person detection using the infrared sensor. When using the infrared sensor, infrared light is reflected on and returned from a target regardless of whether the target is a person or any object other than the person, but use of face detection can prevent just an object from being detected as a person by mistake. For example, in an electronic apparatus such as a personal computer, a camera for capturing an image for face detection described above is provided at a position capable of imaging the side where a person using the electronic apparatus is present.

However, no face may be detected from a captured image of the camera depending on the usage situation of the electronic apparatus despite the presence of the person using the electronic apparatus. For example, a camera cover capable of physically blocking the imaging direction of the camera may be provided for the camera provided in an electronic apparatus from the viewpoint of privacy protection and the like. In a case where this camera cover is closed to block the imaging direction of the camera, any face is no longer detected even when a person using the electronic apparatus is present. Further, when the camera is covered by hand, since the imaging direction of the camera is also blocked in the same way, any face is no longer detected. In addition, no face may be detected depending, for example, on the relationship between the position of a person using the electronic apparatus and the direction in which the camera captures images. When no face is detected despite the presence of the person using the electronic apparatus, there is a problem that the electronic apparatus makes a transition to a standby state.

SUMMARY

One or more embodiments of the present invention provide an electronic apparatus and a control method for controlling the operating state properly according to the usage situation.

An electronic apparatus according to one or more embodiments of the present invention includes: a memory which temporarily stores a program of a system; a first processor which executes the program to implement functions of the system; a second processor which detects a face area with a face captured therein from an image captured by an imaging unit; and a third processor which switches between and executes first processing in which, when the face area is detected by the second processor, first information is output, while when the face area is not detected, second information is output, and second processing to output the first information despite the detection of the face area by the second processor, wherein when there is no operation input by a user over a certain period of time, the first processor restricts use of at least some of the functions of the system, and when acquiring the second information from the third processor, the first processor restricts use of at least some of the functions of the system without waiting for the certain period of time.

Further, an electronic apparatus according to the second aspect of the present invention includes: a memory which temporarily stores a program of a system; a first processor which executes the program to implement functions of the system; a second processor which detects a face area with a face captured therein from an image captured by an imaging unit, and when detecting the face area, which detects the direction of a line of sight from eyes of the face included in the face area; and a third processor which outputs first information when the face area is detected by the second processor and the direction of the line of sight is within a predetermined range, or switches between and executes first processing to output second information when the face area is detected and the direction of the line of sight is out of the predetermined range or when the face area is not detected, and second processing to output the first information despite the detection of the face area and the direction of the line of sight by the second processor, wherein when there is no operation input by a user over a certain period of time, the first processor restricts use of at least some of the functions of the system, and when acquiring the second information from the third processor, the first processor restricts use of at least some of the functions of the system without waiting for the certain period of time.

The above electronic apparatus may also be such that the second processor determines whether or not an imaging direction of the imaging unit is blocked based on the image captured by the imaging unit, and when it is determined by the second processor that the imaging direction of the imaging unit is not blocked, the third processor executes the first processing, while when it is determined that the imaging direction of the imaging unit is blocked, the third processor executes the second processing.

The above electronic apparatus may also include: a first chassis having at least the imaging unit; a second chassis having at least an input unit; and a rotating mechanism which connects the first chassis and the second chassis in a manner to be rotatable relative to each other, wherein in a case where a rotation angle when the first chassis and the second chassis are rotated relative to each other is within a predetermined range, the third processor executes the first processing, while when the rotation angle is out of the predetermined range, the third processor executes the second processing.

The above electronic apparatus may further include an output interface which outputs display image data for displaying a display image based on the functions of the system on an external display, wherein in a state where the display image is not displayed on the external display, the third processor executes the first processing, while in a state where the display image is being displayed on the external display, the third processor executes the second processing.

Further, the above electronic apparatus may be such that the third processor repeatedly executes the first processing or the second processing in such a manner that a cycle of repeatedly executing the second processing is set longer than a cycle of repeatedly executing the first processing.

A control method for an electronic apparatus according to the third aspect of the present invention is a control method for an electronic apparatus including: a memory which temporarily stores a program of a system; and a first processor, a second processor, and a third processor which implement functions of the system by executing the program, the control method including: a step of causing the second processor to detect a face area with a face captured therein from an image captured by an imaging unit; a step in which when the face area is detected by the second processor, the third processor outputs first information, while when the face area is not detected, the third processor switches between and executes first processing to output second information and second processing to output the first information despite the detection of the face area by the second processor; a step in which when there is no operation input by a user over a certain period of time, the first processor restricts use of at least some of the functions of the system; and a step in which when the second information is acquired from the third processor, the first processor restricts use of at least some of the functions of the system without waiting for the certain period of time.

Further, a control method for an electronic apparatus according to the fourth aspect of the present invention is a control method for an electronic apparatus including: a memory which temporarily stores a program of a system; and a first processor, a second processor, and a third processor which implement functions of the system by executing the program, the control method including: a step of causing the second processor to detect a face area with a face captured therein from an image captured by an imaging unit, and when detecting the face area, causing the second processor to detect a line-of-sight direction from eyes of the face included in the face area; a step in which when the face area is detected by the second processor and the line-of-sight direction is within a predetermined range, the third processor outputs first information, while when the face area is detected but the line-of-sight direction is out of the predetermined range, or when the face area is not detected, the third processor switches between and executes first processing to output second information and second processing to output the first information despite the detection of the face area and the line-of-sight direction by the second processor; a step in which when there is no operation input by a user over a certain period of time, the first processor restricts use of at least some of the functions of the system; and a step in which when the second information is acquired from the third processor, the first processor restricts use of at least some of the functions of the system without waiting for the certain period of time.

The above-described aspects of the present invention can control the operating state of the electronic apparatus properly according to the usage situation.

DETAILED DESCRIPTION

Embodiments of the present invention will be described below with reference to the accompanying drawings.

First Embodiment

[Outline]

First, the outline of an electronic apparatus 1 according to one or more embodiments will be described. The electronic apparatus 1 according to one or more embodiments is, for example, a laptop PC (Personal Computer).

The electronic apparatus 1 has at least a "normal operating state" and a "standby state" as system operating states. The normal operating state is an operating state capable of executing processing without being particularly limited, which corresponds, for example, to S0 state defined in the ACPI (Advanced Configuration and Power Interface) specification.

The standby state is a state in which use of at least some functions of the system are limited. For example, the standby state may be the standby state or a sleep state, which is a state corresponding to modern standby in Windows (registered trademark), S3 state (sleep state) defined in the ACPI specification, or the like. Note that the standby state may also be a state in which at least the display of a display unit appears to be OFF (screen OFF), or a screen lock state. The screen lock is a state in which an image preset to make a processed content invisible (for example, an image for the screen lock) is displayed on the display unit, that is, an unusable state until the lock is released by user authentication or the like. In other words, the standby state corresponds, for example, to any one of an operating state lower in power consumption than the normal operating state, a state in which a working content of the electronic apparatus 1 is not visible to a user, and a state in which the user cannot use the electronic apparatus 1.

Further, the system operating states include "stopped states" further lower in power consumption than the standby state. For example, the stopped states are a hibernation state, a power-off state, and the like. The hibernation state corresponds, for example, to S4 state defined in the ACPI specification. The power-off state corresponds, for example, to S5 state (shutdown state) defined in the ACPI specification.

In the following, a transition of the system operating state from the standby state or the stopped state to the normal operating state may also be called "boot." For example, since the standby state and the stopped state are lower in activation level than the normal operating state, the boot of the system of the electronic apparatus 1 leads to the activation of the operation of the system in the electronic apparatus 1.

Figure 1A:
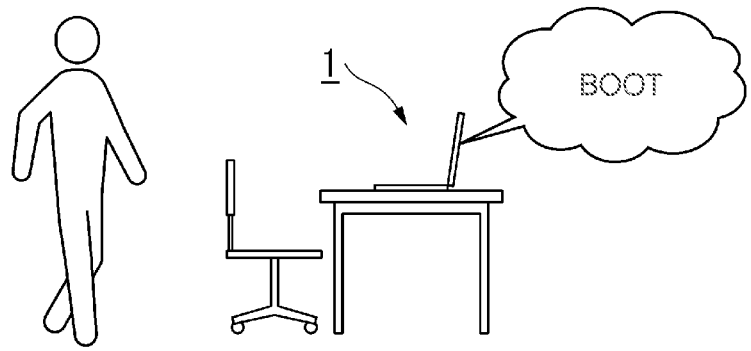
FIGS. 1(A) to 1(C) are diagrams for describing an outline of HPD processing of an electronic apparatus according to one or more embodiments.
Figure 1B:
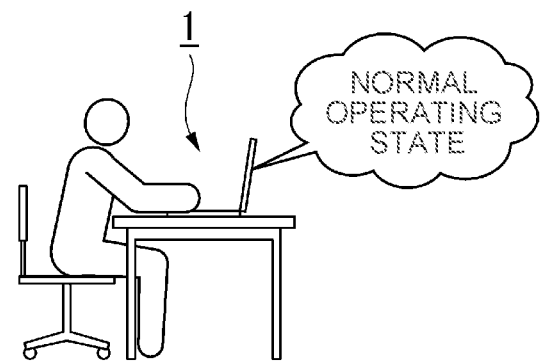
Figure 1C:
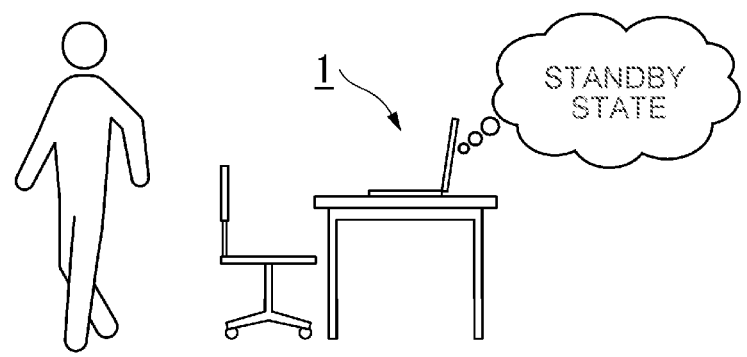

FIGS. 1(A) to 1(C) are diagrams for describing an outline of HPD processing of the electronic apparatus 1 according to one or more embodiments. The electronic apparatus 1 detects a person (i.e., the user) present in the neighborhood of the electronic apparatus 1. This processing to detect the presence of a person is called HPD (Human Presence Detection) processing. The electronic apparatus 1 detects the presence or absence of a person by the HPD processing to control the operating state of the system of the electronic apparatus 1 based on the detection result. For example, as illustrated in FIG. 1(A), when detecting a change from a state where no person is present in front of the electronic apparatus 1 (Absence) to a state where a person is present (Presence), that is, when detecting that a person has approached the electronic apparatus 1 (Approach), the electronic apparatus 1 determines that the user has approached and automatically boots the system to make the transition to the normal operating state. Further, in a state where a person is present in front of the electronic apparatus 1 (Presence) as illustrated in FIG. 1(B), the electronic apparatus 1 determines that the user is present and continues the normal operating state. Then, as illustrated in FIG. 1(C), when detecting a change from the state where the person is present in front of the electronic apparatus 1 (Presence) to a state where no person is present (Absence), that is, when detecting that the person has left the electronic apparatus 1 (Leave), the electronic apparatus 1 determines that the user has left and causes the system to make the transition to the standby state.

For example, the electronic apparatus 1 has a face detection function to detect a face area with a face captured therein from a captured image captured forward (on the front side) in order to determine whether or not the user is present in front of the electronic apparatus 1. When the face area is detected from the captured image, the electronic apparatus 1 determines that the user is present. On the other hand, when no face area is detected from the captured image, the electronic apparatus 1 determines that the user is not present. In other words, when the face area is detected from a state in which no face area is detected from the captured image, the electronic apparatus 1 detects that the user has approached the electronic apparatus 1 (Approach), and causes the system to make the transition to the normal operating state. Further, when any face area is no longer detected from the state in which the face area is detected from the captured image, the electronic apparatus 1 detects that the user has left the electronic apparatus 1 (Leave), and causes the system to make the transition to the standby state.

[Appearance Configuration of Electronic Apparatus]

Figure 2:
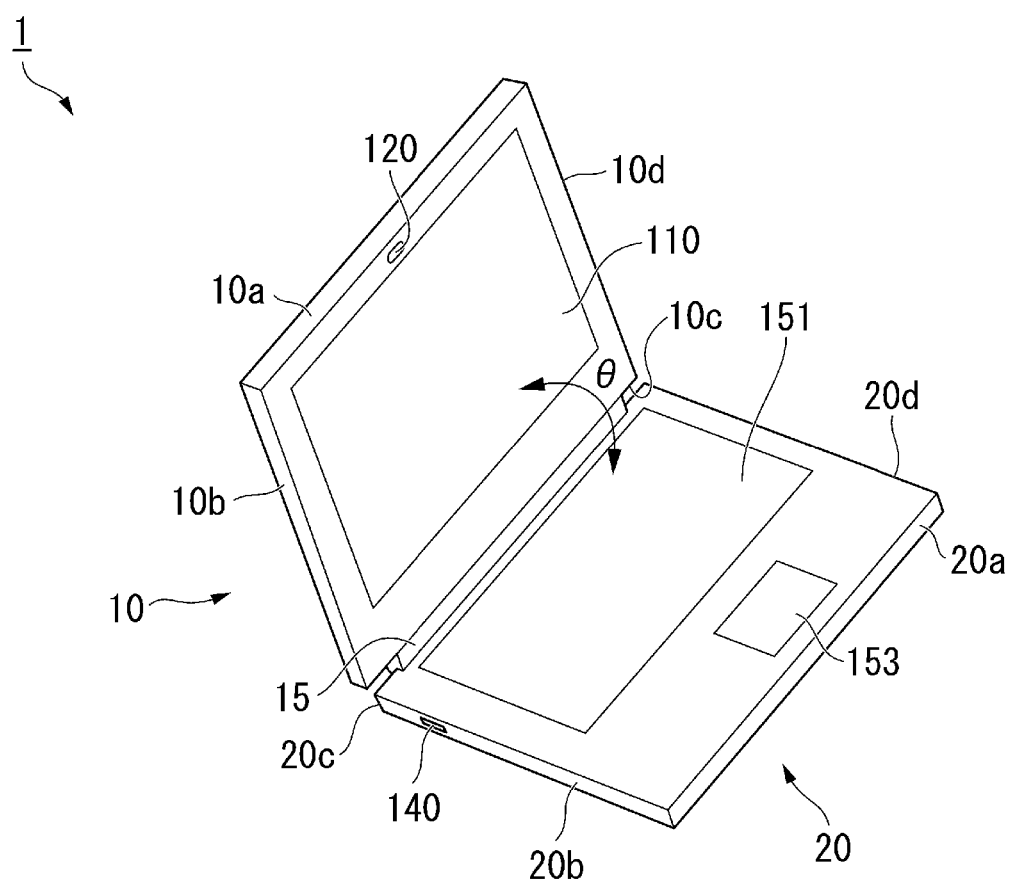
FIG. 2 is a perspective view illustrating an appearance configuration example of the electronic apparatus according to one or more embodiments.

FIG. 2 is a perspective view illustrating an appearance configuration example of the electronic apparatus 1 according to one or more embodiments.

The electronic apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. An open angle by the rotation between the first chassis 10 and the second chassis 20 is denoted by "θ" in FIG. 2.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The appearance of the electronic apparatus 1 in FIG. 2 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when the user uses the electronic apparatus 1, and the electronic apparatus 1 is often used in a state where the open angle is typically about θ=100° to 130°. Note that the range of open angles θ to be the open state can be set arbitrarily according to the range of angles rotatable by the hinge mechanism 15 or the like.

A display unit 110 is provided on the inner face of the first chassis 10. The display unit 110 is configured to include a liquid crystal display (LCD) or an organic EL (Electro Luminescence) display, and the like. Further, a camera 120 is provided in a peripheral area of the display unit 110 on the inner face of the first chassis 10. For example, the camera 120 is arranged on the side of the side face 10a in the peripheral area of the display unit 110. Note that the position at which the camera 120 is arranged is just an example, and it may be elsewhere as long as the camera 120 can face a direction (frontward) to face the inner face of the first chassis 10.

In the open state, the camera 120 captures an image in a predetermined imaging range in the direction (frontward) to face the inner face of the first chassis 10. The predetermined imaging range is a range of angles of view defined by an image sensor included in the camera 120 and an optical lens provided in front of the imaging surface of the image sensor. For example, the camera 120 can capture an image including a person (user) present in front of the electronic apparatus 1. The electronic apparatus 1 detects a face area from the captured image captured with this camera 120 to perform HPD processing in order to control the operating state of the system as described with reference to FIGS. 1(A) to 1(C).

Further, a power button 140 is provided on the side face 20b of the second chassis 20. The power button 140 is an operating element used by the user to give an instruction to power on (transition from the stopped state to the normal operating state) or power off (transition from the normal operating state to the stopped state). Further, a keyboard 151 and a touch pad 153 are provided as an input device on the inner face of the second chassis 20. Note that a touch sensor may also be included as the input device instead of or in addition to the keyboard 151 and the touch pad 153, or a mouse and an external keyboard may also be connected. When the touch sensor is provided, it may be constructed as a touch panel with the touch sensor provided in an area corresponding to the display surface of the display unit 110 to accept operations. Further, a microphone used to input voice may be included in the input device.

In the closed state where the first chassis 10 and the second chassis 20 are closed, the display unit 110 and the camera 120 provided on the inner face of the first chassis 10, and the keyboard 151 and the touch pad 153 provided on the inner face of the second chassis 20 are covered with each other's chassis faces, respectively. In this case, the electronic apparatus 1 is put in a state of being disabled from fulfilling the functions thereof.

[Camera Cover Structure]

Figure 3:
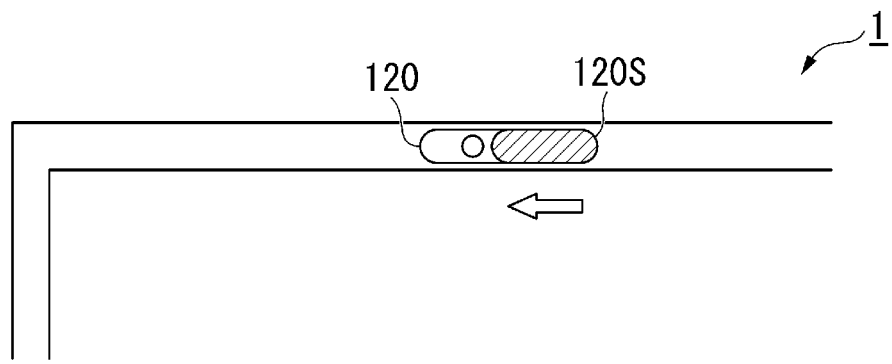
FIG. 3 is a diagram illustrating an example of an open state of a camera cover according to one or more embodiments.
Figure 4:
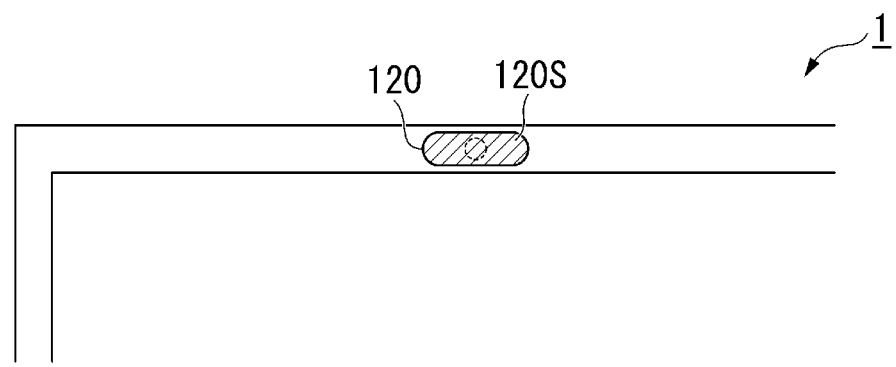
FIG. 4 is a diagram illustrating an example of a closed state of the camera cover according to one or more embodiments.

Next, the structure of a camera cover provided for the camera 120 will be described. A camera cover capable of physically blocking an imaging direction by a user operation is provided for the camera 120. FIG. 3 and FIG. 4 are diagrams illustrating examples of the camera cover according to one or more embodiments. A camera cover 120S is provided to be able to be moved to a position at which the imaging direction of the camera 120 provided on the first chassis 10 is blocked (slidably moved in a direction indicated by an arrow in FIG. 3). FIG. 3 illustrates a state in which the camera cover 120S is open, that is, a state in which the imaging direction of the camera 120 is not blocked. On the other hand, FIG. 4 illustrates a state in which the camera cover 120S is moved from the state illustrated in FIG. 3 in the direction indicated by the arrow in FIG. 3 and put in a closed state, that is, FIG. 4 illustrates a state in which the imaging direction of the camera 120 is blocked.

For example, as described with reference to FIGS. 1(A) to 1(C), when a change from a state where a face area is detected from a captured image in the normal operating state to a state where the face area is no longer detected, the electronic apparatus 1 detects that the user has left the electronic apparatus 1 (Leave) and causes the system to make the transition to the standby state. However, as illustrated in FIG. 4, in the state where the imaging direction of the camera 120 is blocked by the camera cover 120S, since the user will not be in the captured image captured with the camera 120 even if the user is present in front of the electronic apparatus 1, any face area is no longer detected from the captured image.

Figure 5:
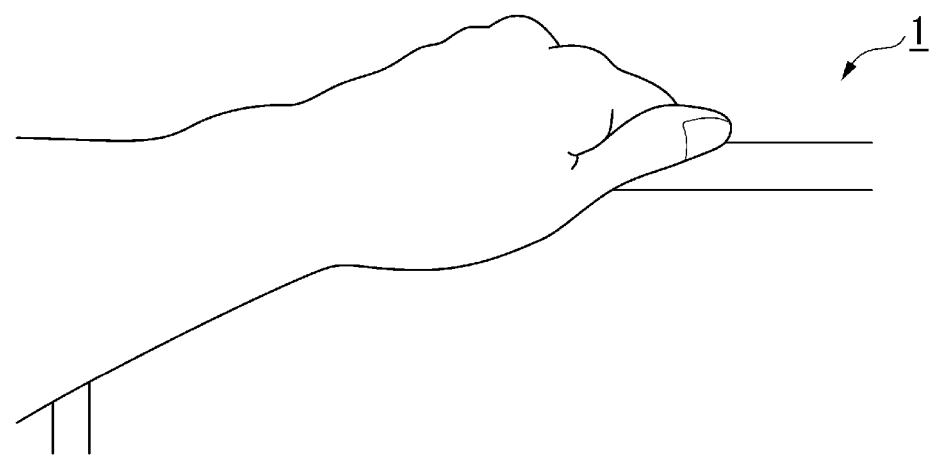
FIG. 5 is a diagram illustrating a state in which the imaging direction of a camera is blocked by hand according to one or more embodiments.

Further, FIG. 5 is a diagram illustrating a state in which the imaging direction of the camera 120 is blocked by a user's hand. Even in this case illustrated in FIG. 5, since the user will not be in the captured image captured with the camera 120 even if the user is present in front of the electronic apparatus 1, any face area is no longer detected from the captured image.

Therefore, in one or more embodiments, it is determined whether or not the imaging direction is blocked to control the system not to make the transition to the standby state even when no face area is detected from the captured image in the blocked state. The configuration and processing of one or more embodiments will be described in detail below.

[Hardware Configuration of Electronic Apparatus]

Figure 6:
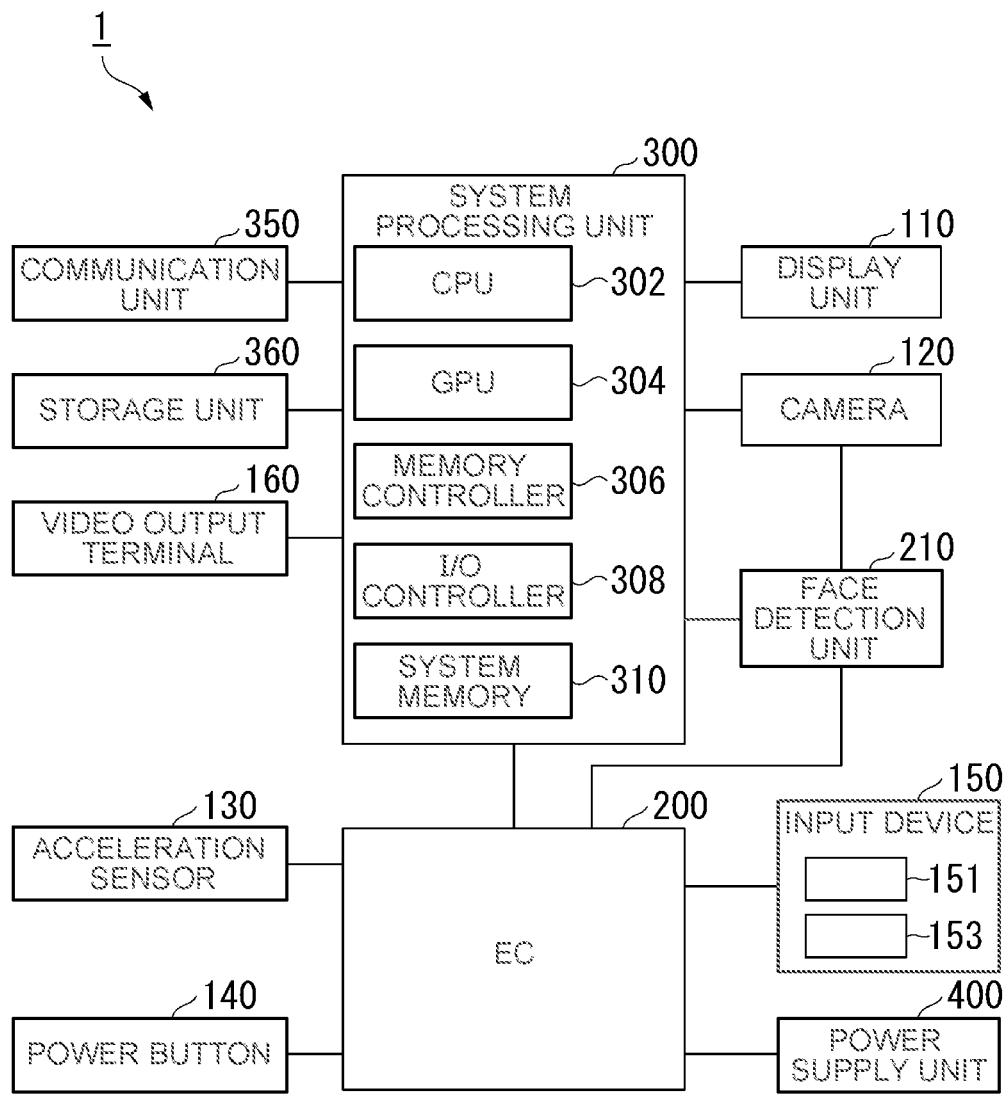
FIG. 6 is a block diagram illustrating an example of the hardware configuration of the electronic apparatus according to one or more embodiments.

FIG. 6 is a block diagram illustrating an example of the hardware configuration of the electronic apparatus 1 according to one or more embodiments. In FIG. 6, components corresponding to those in FIG. 2 are given the same reference numerals. The electronic apparatus 1 is configured to include the display unit 110, the camera 120, an acceleration sensor 130, the power button 140, an input device 150, a video output terminal 160, an EC (Embedded Controller) 200, a face detection unit 210, a system processing unit 300, a communication unit 350, a storage unit 360, and a power supply unit 400. The display unit 110 displays display data (images) generated based on system processing executed by the system processing unit 300, processing of an application program running on the system processing, and the like.

The camera 120 captures an image of an object within a predetermined angle of view in a direction (frontward) to face the inner face of the first chassis 10, and outputs the captured image to the system processing unit 300 and the face detection unit 210. The camera 120 may be a normal camera or an infrared camera. The normal camera is a camera having a visible light sensor for receiving visible light as an image sensor (for example, an RGB camera). The infrared camera is a camera having an infrared sensor for receiving infrared light as an image sensor. The camera 120 temporarily stores image data of captured images in a system memory 310.

The acceleration sensor 130 detects the orientation of the electronic apparatus 1 with respect to the direction of gravity, and outputs a detection signal indicative of the detection result to the EC 200. For example, the acceleration sensor 130 is provided in each of the first chassis 10 and the second chassis 20 to detect each of the orientation of the first chassis 10 and the orientation of the second chassis 20, and output, to the EC 200, each of detection signals indicative of the detection results, respectively. Based on the detection results of the orientation of the first chassis 10 and the orientation of the second chassis 20, the open/closed state of the electronic apparatus 1, the open angle θ between the first chassis 10 and the second chassis 20, and the like can be detected. Note that a gyro sensor, a tilt sensor, a geomagnetic sensor, and the like may also be included instead of or in addition to the acceleration sensor 130.

The power button 140 outputs, to the EC 200, operation signals according to user's operations. The input device 150 is an input unit for accepting user input, which is configured to include, for example, the keyboard 151 and the touch pad 153. In response to accepting operations on the keyboard 151 and the touch pad 153, the input device 150 outputs, to the EC 200, operation signals indicative of the operation content.

The video output terminal 160 is a connecting terminal for connecting to an external display (display device). For example, the video output terminal 160 is an HDMI (registered trademark) terminal, a USB Type-C terminal, a display port, or the like.

The power supply unit 400 supplies power through a power system for supplying power to each unit according to the operating state of each unit of the electronic apparatus 1. The power supply unit 400 includes a DC (Direct Current)/DC converter. The DC/DC converter converts the voltage of DC power, supplied from an AC (Alternate Current)/DC adapter or a battery pack, to a voltage required for each unit. The power with the voltage converted by the DC/DC converter is supplied to each unit through each power system. For example, the power supply unit 400 supplies power to each unit through each power system based on a control signal according to the operating state of each unit input from the EC 200.

The EC 200 is a microcomputer configured to include a CPU (Central Processing Unit), a RAM (Random Access Memory), a ROM (Read Only Memory), a flash ROM, multi-channel A/D input terminal and D/A output terminal, digital input/output terminals, and the like. For example, the CPU of the EC 200 reads a control program (firmware) prestored in the ROM or an external ROM and executes the read control program to fulfill the function. The EC 200 is connected to the acceleration sensor 130, the power button 140, the input device 150, the face detection unit 210, the system processing unit 300, the power supply unit 400, and the like.

For example, when receiving an operation signal according to a user's operation to the power button 140, the EC 200 instructs the system processing unit 300 to boot the system or the like. Further, based on the detection result by the face detection unit 210, the EC 200 gives an instruction to boot the system or an instruction to make an operating state transition. Further, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the electronic apparatus 1.

Further, the EC 200 acquires operation signals from the input device 150 and the like, and outputs, to the system processing unit 300, an operation signal required in processing of the system processing unit 300 among the acquired operation signals. Further, the EC 200 acquires the detection signal from the acceleration sensor 130 to detect, based on the acquired detection signal, the orientation of the electronic apparatus 1 (the orientation of the first chassis 10 and the orientation of the second chassis 20), the open angle θ between the first chassis 10 and the second chassis 20, and the like.

Note that some of the functions of the EC 200 may also be configured as a sensor hub or a chipset.

The face detection unit 210 is a processor which processes image data of captured images captured with the camera 120. For example, the face detection unit 210 acquires a captured image captured with the camera 120 to execute face detection processing to detect a face area with a face captured therein from the acquired captured image. Further, based on the detection result of the face detection processing, the face detection unit 210 executes HPD processing to detect whether or not the user (person) is present in front of the electronic apparatus 1 and to output the detection result.

The system processing unit 300 is configured to include a CPU (Central Processing Unit) 302, a GPU (Graphic Processing Unit) 304, a memory controller 306, an I/O (Input-Output) controller 308, and the system memory 310, where processing of various application programs is executable on an OS (Operating System) by system processing based on the OS. The CPU 302 and the GPU 304 may be collectively called a processor.

The CPU 302 executes processing by the OS and processing by the application programs running on the OS. Further, the CPU 302 causes the operating state of the system to make a transition according to an instruction from the EC 200. For example, when the operating state is the stopped state or the standby state, and a boot instruction is received from the EC 200, the CPU 302 executes boot processing to make the transition from the stopped state or the standby state to the normal operating state. Further, when receiving an instruction to make the transition to the standby state in the normal operating state, the CPU 302 makes the transition from the normal operating state to the standby state. Further, when receiving a shutdown instruction in the normal operating state, the CPU 302 executes shutdown processing to make the transition from the normal operating state to the stopped state.

Further, the CPU 302 executes login processing to determine whether or not to allow access to the OS in the boot processing. When the boot processing by the OS is started, the CPU 302 executes the login processing before allowing the access to the OS, and the transition to the normal operating state is paused until login is allowed in the login processing. In the login processing, user authentication processing is performed to determine whether or not a person using the electronic apparatus 1 is a preregistered, authorized user. As the authentication, there are password authentication, face authentication, fingerprint authentication, and the like.

When the authentication result is successful, the CPU 302 allows the login and resumes the execution of the paused system processing. On the other hand, when the authentication result is unsuccessful, the CPU 302 does not allow the login and leaves the execution of the system processing paused.

The GPU 304 is connected to the display unit 110. The GPU 304 executes image processing under the control of the CPU 302 to generate display data. The GPU 304 outputs the generated display data to the display unit 110. Note that the CPU 302 and the GPU 304 may be integrally formed as one core, or the load may be shared between the CPU 302 and the GPU 304 formed as individual cores, respectively. The number of processors is not limited to one, and it may be plural.

The memory controller 306 controls reading data from and writing data to the system memory 310, the storage unit 360 and the like by the CPU 302 and the GPU 304.

The I/O controller 308 controls input/output of data from the communication unit 350, the display unit 110, and the EC 200.

The system memory 310 is used as a reading area of an execution program of the processor and a working area to write processed data. Further, the system memory 310 temporarily stores image data of a captured image(s) captured with the camera 120.

The communication unit 350 is connected to other devices communicably through a wireless or wired communication network to transmit and receive various data. For example, the communication unit 350 is configured to include a wired LAN interface such as the Ethernet (registered trademark), a wireless LAN interface such as Wi-Fi (registered trademark), and the like.

The storage unit 360 is configured to include storage media, such as an HDD (Hard Disk Drive) or an SDD (Solid State Drive), a ROM, a flash ROM, and the like. The storage unit 360 stores the OS, device drivers, various programs such as applications, and various data acquired by the operation of the programs.

Note that the system processing unit 300 may be configured as one package as a SoC (System on a Chip), or some of the functions may be configured as any other part such as a chipset or a sensor hub.

[Functional Configuration]

Next, the functional configuration of the electronic apparatus 1 to control the operating state of the system by the HPD processing will be described. In the following, a functional configuration to execute processing for causing the system to make the transition from the normal operating state to the standby state (hereinafter called "sleep processing") will be mainly described in detail.

Figure 7:
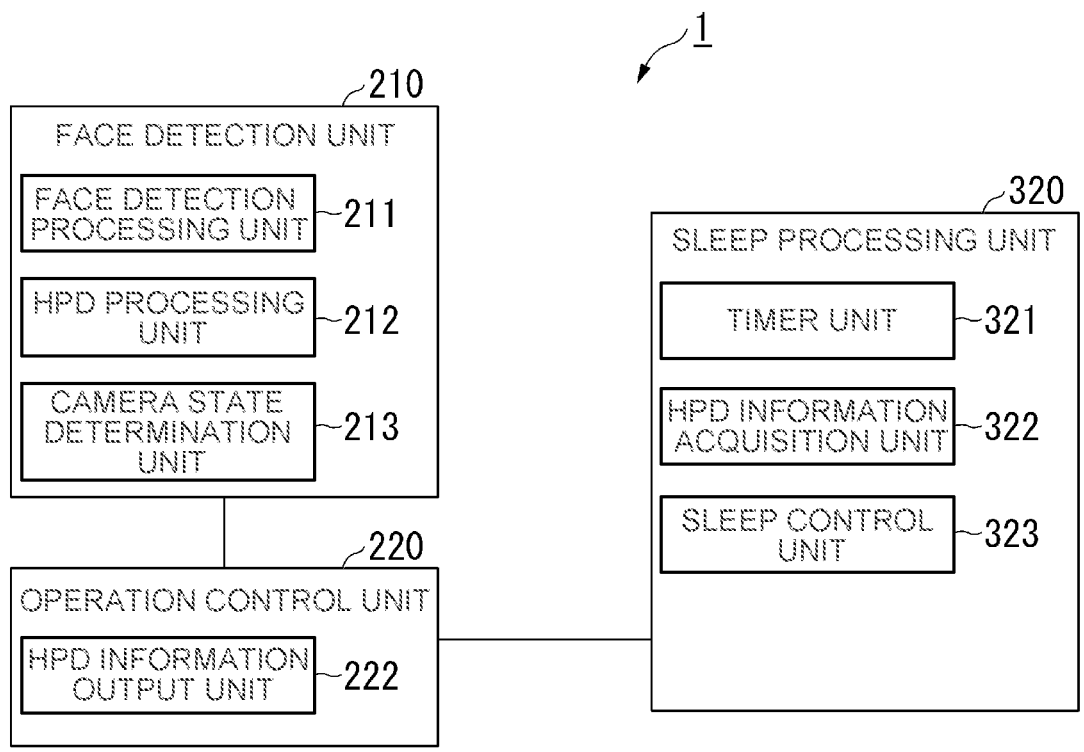
FIG. 7 is a block diagram illustrating an example of the functional configuration of the electronic apparatus according to one or more embodiments.

FIG. 7 is a block diagram illustrating an example of the functional configuration of the electronic apparatus 1 according to one or more embodiments. The electronic apparatus 1 includes the face detection unit 210, an operation control unit 220, and a sleep processing unit 320. The face detection unit 210 corresponds to the face detection unit 210 illustrated in FIG. 6. The operation control unit 220 is a functional component implemented by the EC 200 illustrated in FIG. 6 executing a control program. The sleep processing unit 320 is a functional component implemented by the system processing unit 300 illustrated in FIG. 6 executing an OS program.

The face detection unit 210 includes a face detection processing unit 211, an HPD processing unit 212, and a camera state determination unit 213. The face detection processing unit 211 reads, from the system memory 310, image data of captured images captured with the camera 120 at predetermined time intervals to perform image processing and image analysis on each of the captured images captured at the predetermined time intervals, respectively.

For example, the face detection processing unit 211 detects a face area from each of the captured images captured at the predetermined time intervals, respectively. As the face detection method, any detection method using a face detection algorithm to detect a face based on facial feature information, using trained data (learned model) subjected to machine learning based on the facial feature information, using a face detection library, or the like can be applied. Further, every predetermined time interval can be set to a 15 second interval, a 10 second interval, or the like, but any other time interval can also be set. Note that in the case of the shortest time interval, the face area is detected for every consecutive frame. The face detection processing unit 211 detects a face area from each of the captured images, respectively, and outputs coordinate information of the detected face area.

Based on whether or not a face area is detected from the captured image by the face detection processing unit 211, the HPD processing unit 212 determines whether or not the user is present in front of the electronic apparatus 1. For example, when the face area is detected from the captured image by the face detection processing unit 211, the HPD processing unit 212 determines that the user is present in front of the electronic apparatus 1. On the other hand, when no face area is detected from the captured image by the face detection processing unit 211, the HPD processing unit 212 determines that the user is not present in front of the electronic apparatus 1. Then, the HPD processing unit 212 outputs HPD information based on the determination result of whether or not the user is present in front of the electronic apparatus 1.

For example, when the determination result is changed from a state in which the user is not present in front of the electronic apparatus 1 to a state in which the user is present, the HPD processing unit 212 outputs HPD information indicating that the user has approached the electronic apparatus 1 (hereinafter called "Approach information"). Further, while the state of the presence of the user in front of the electronic apparatus 1 is being determined, the HPD processing unit 212 outputs HPD information indicating that the user is present in front of the electronic apparatus 1 (hereinafter called "Presence information"). Further, when the detection result is changed from the state where the user is present in front of the electronic apparatus 1 to the state where the user is not present, the HPD processing unit 212 outputs HPD information indicating that the user has left the electronic apparatus 1 (hereinafter called "Leave information"). Based on the detection result of the face area by the face detection processing unit 211, the HPD processing unit 212 outputs the Approach information, the Presence information, or the Leave information to the operation control unit 220.

The camera state determination unit 213 determines whether or not the imaging direction of the camera 120 is blocked based on each of the captured images captured with the camera 120 at the predetermined time intervals, respectively. The state where the imaging direction of the camera 120 is blocked is a state where the camera cover 120S is closed as illustrated in FIG. 4, a state where the imaging direction of the camera 120 is blocked by the user's hand as illustrated in FIG. 5, or the like.

For example, the camera state determination unit 213 determines, for each captured image captured with the camera 120, whether or not an image area of a given percentage (for example, 90%) or more is a black area. The camera state determination unit 213 reads, from the system memory 310, each of the captured images captured with the camera 120 at the predetermined time intervals, respectively, and determines whether or not the given percentage (for example, 90%) of the captured image of the read image data or more is black. For example, the camera state determination unit 213 determines that pixels in each of which a luminance value is less than a predetermined value in the captured image are black. As an example, the camera state determination unit 213 determines that the pixels whose luminance values are less than 10 at 256-gradations from a luminance value 0 (black) to a luminance value 255 (white) are black.

Further, when determining that the given percentage or more of the captured image is black, the camera state determination unit 213 determines whether or not such a state that the given percentage or more of the captured image is black has continued for a predetermined period of time (for example, ten seconds). Then, when determining that the state where the given percentage or more of the captured image is black has continued for the predetermined period of time, the camera state determination unit 213 determines that the imaging direction of the camera 120 is blocked. On the other hand, when determining that the given percentage or more of the captured image is not black, or when determining that the state where the given percentage or more of the captured image is black has not continued for the predetermined period of time, the camera state determination unit 213 determines that the imaging direction of the camera 120 is not blocked. The camera state determination unit 213 outputs, to the operation control unit 220, information indicative of the determination result of whether the imaging direction of the camera 120 is blocked or not (hereinafter called "camera state information").

Based on the detection result of the face detection unit 210, the operation control unit 220 instructs the system processing unit 300 to control the system operating state. For example, the operation control unit 220 acquires the Approach information, the Presence information, or the Leave information output from the face detection unit 210 (HPD processing unit 212). Further, the operation control unit 220 acquires the camera state information output from the face detection unit 210 (camera state determination unit 213).

For example, when acquiring the Approach information in the standby state, the operation control unit 220 gives an instruction to make the transition from the standby state to the normal operating state. For example, the operation control unit 220 gives an instruction to the system processing unit 300 to boot the system. More specifically, when booting the system, the operation control unit 220 outputs the control signal to the power supply unit 400 to supply power required for the operation of each unit of the electronic apparatus 1. After that, the operation control unit 220 outputs a boot signal to instruct the system processing unit 300 to boot the system. When acquiring the boot signal, the system processing unit 300 boots the system to make the transition from the standby state to the normal operating state.

Further, the operation control unit 220 includes an HPD information output unit 222. In the normal operating state, the HPD information output unit 222 switches between and executes a face detection enabled mode and a face detection disabled mode based on the camera state information acquired from the face detection unit 210 (camera state determination unit 213). For example, based on the camera state information, when the imaging direction of the camera 120 is not blocked, the HPD information output unit 222 executes the face detection enabled mode. On the other hand, based on the camera state information, when the imaging direction of the camera 120 is blocked, the HPD information output unit 222 executes the face detection disabled mode.

In the face detection enabled mode, when acquiring the Presence information from the face detection unit 210, the HPD information output unit 222 outputs, to the system processing unit 300, the Presence information as HPD information, while when acquiring the Leave information from the face detection unit 210, the HPD information output unit 222 outputs, to the system processing unit 300, the Leave information as the HPD information. In other word, in the face detection enabled mode, the HPD information output unit 222 outputs the Presence information when a face area is detected from the captured image by the face detection unit 210, or outputs the Leave information when no face area is detected.

On the other hand, in the face detection disabled mode, the HPD information output unit 222 outputs the Presence information to the system processing unit 300 regardless of the information output from the face detection unit 210. In other word, in the face detection disabled mode, the HPD information output unit 222 outputs the Presence information regardless of whether or not a face area is detected from the captured image.

The sleep processing unit 320 executes sleep processing to cause the system to make the transition from the normal operating state to the standby state. The sleep processing unit 320 includes a timer unit 321, an HPD information acquisition unit 322, and a sleep control unit 323.

The timer unit 321 is configured to include a timer for measuring an elapsed time from the last operation input in the normal operating state. The timer in the timer unit 321 is reset each time operation input by the user is detected. The operation input by the user is, for example, operation input with a user's operation to the input device 150.

The HPD information acquisition unit 322 acquires the HPD information output from the operation control unit 220 (HPD information output unit 222). For example, in the normal operating state, the HPD information acquisition unit 322 acquires the Presence information or the Leave information from the operation control unit 220.

When there is no operation input by the user for a certain period of time in the normal operating state, the sleep control unit 323 causes the system to make the transition from the normal operating state to the standby state as an OS function. For example, the sleep control unit 323 acquires, from the EC 200, information on the presence or absence of an operation to the input device 150, and when there is an operation to the input device 150, the sleep control unit 323 resets the timer in the timer unit 321. Then, the sleep control unit 323 determines whether or not an elapsed time measured by the timer unit 321 reaches a preset sleep time, and when the elapsed time reaches the sleep time, the sleep control unit 323 determines that there is no operation input by the user for the certain period of time to cause the system to make the transition from the normal operating state to the standby state. The sleep time is set, for example, to five minutes or the like. Note that the sleep time can also be set to any time by the user.

Further, when the HPD information acquisition unit 322 acquires the Leave information, the sleep control unit 323 causes the system to make the transition from the operating state to the standby state in response to the fact that the HPD information acquisition unit 322 acquires the Leave information. In other word, when the HPD information acquisition unit 322 acquires the Leave information, the sleep control unit 323 causes the system to make the transition from the normal operating state to the standby state without waiting for the certain period of time in the state where there is no operation input by the user. On the other hand, while the HPD information acquisition unit 322 is acquiring the Presence information, the sleep control unit 323 continues the normal operating state.

Thus, in the state where the imaging direction of the camera 120 is not blocked, when any face area is no longer detected from the captured image, the electronic apparatus 1 can cause the system to make the transition from the normal operating state to the standby state, and when no face area is detected from the captured image due to the fact that the imaging direction of the camera 120 is blocked, the electronic apparatus 1 can continue the normal operating state of the system without transition to the standby state.

Note that when the HPD information acquisition unit 322 acquires the Leave information, the sleep control unit 323 may also make the transition from the normal operating state to the standby state on the condition that the HPD information acquisition unit 322 acquires the Leave information over a certain period of time (for example, 30 seconds). In other words, the sleep control unit 323 may also continue the normal operating state when the HPD information acquisition unit 322 acquires the Presence information before the certain period of time elapses even after the HPD information acquisition unit 322 acquires the Leave information. Thus, since the electronic apparatus 1 continues the normal operating state in the situation that the user leaves for a short time and is back soon, it is convenient without transition to the standby state despite the fact the user has no intension to suspend the use of the electronic apparatus 1.

[Operation of HPD Processing]

Figure 8:
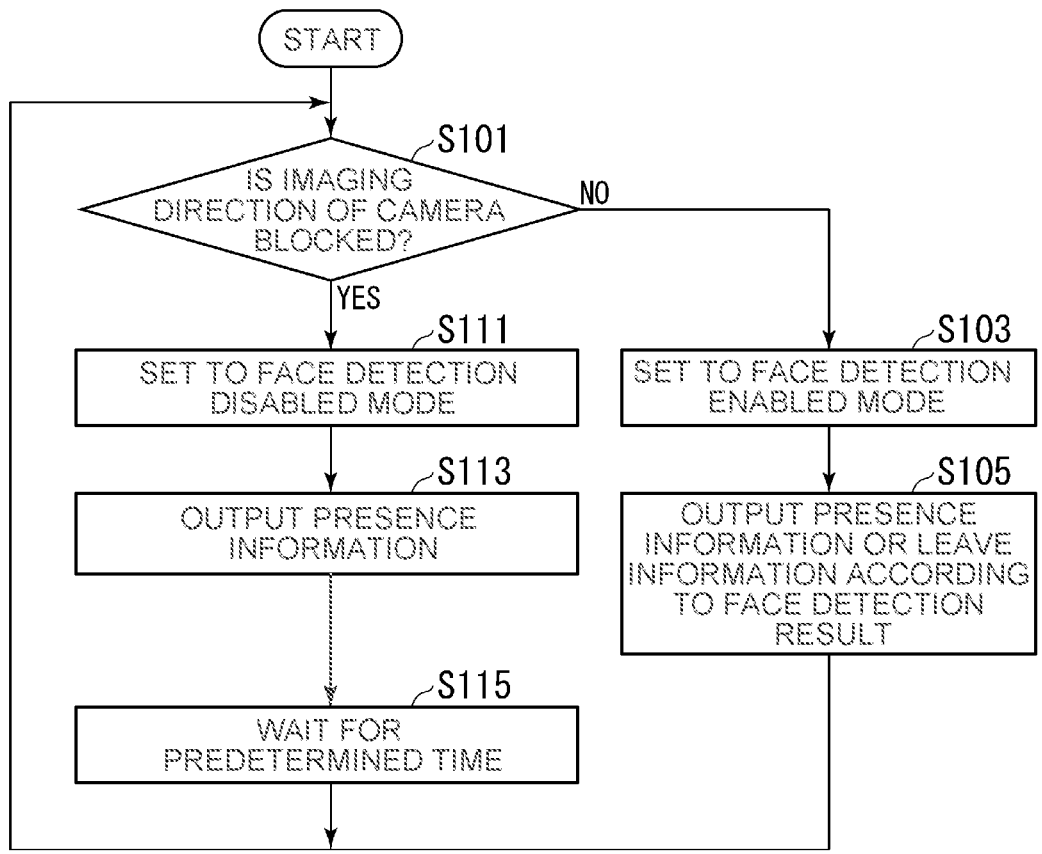
FIG. 8 is a flowchart illustrating an example of HPD processing according to one or more embodiments.

Referring next to FIG. 8, the operation of HPD processing in which the EC 200 (operation control unit 220) outputs HPD information by switching between the face detection enabled mode and the face detection disabled mode in the normal operating state will be described.

FIG. 8 is a flowchart illustrating an example of HPD processing according to one or more embodiments.

(Step S101) Based on the camera state information acquired from the face detection unit 210, the EC 200 determines whether or not the imaging direction of the camera 120 is blocked. When determining that the imaging direction of the camera 120 is not blocked (NO), the EC 200 proceeds to a process in step S103. On the other hand, when determining that the imaging direction of the camera 120 is blocked (YES), the EC 200 proceeds to a process in step S111.

(Step S103) The EC 200 sets the mode to the face detection enabled mode, and proceeds to a process in step S105.

(Step S105) In the face detection enabled mode, the EC 200 outputs, to the system processing unit 300, the Presence information or the Leave information according to the detection result of the face area by the face detection unit 210. Specifically, when acquiring the Presence information from the face detection unit 210, the EC 200 outputs the Presence information to the system processing unit 300, while when acquiring the Leave information, the EC 200 outputs the Leave information to the system processing unit 300. Then, the EC 200 returns to the process in step S101 to repeat the HPD processing.

(Step S111) The EC 200 sets the mode to the face detection disabled mode, and proceeds to a process in step S113.

(Step S113) In the face detection disabled mode, the EC 200 outputs the Presence information to the system processing unit 300. Then, the EC 200 proceeds to a process in step S115.

(Step S115) The EC 200 waits for a predetermined time (for example, one second), and then returns to the process in step S101 to repeat the HPD processing. In the face detection disabled mode, since the result of the face detection processing is not reflected in the HPD processing, the cycle of processing in the face detection disabled mode is made longer than that in the face detection enabled mode. Thus, power consumption can be reduced. Note that the detection frame rate in the face detection disabled mode may also be set lower than that in the face detection enabled mode.

[Operation of Sleep Processing]

Figure 9:
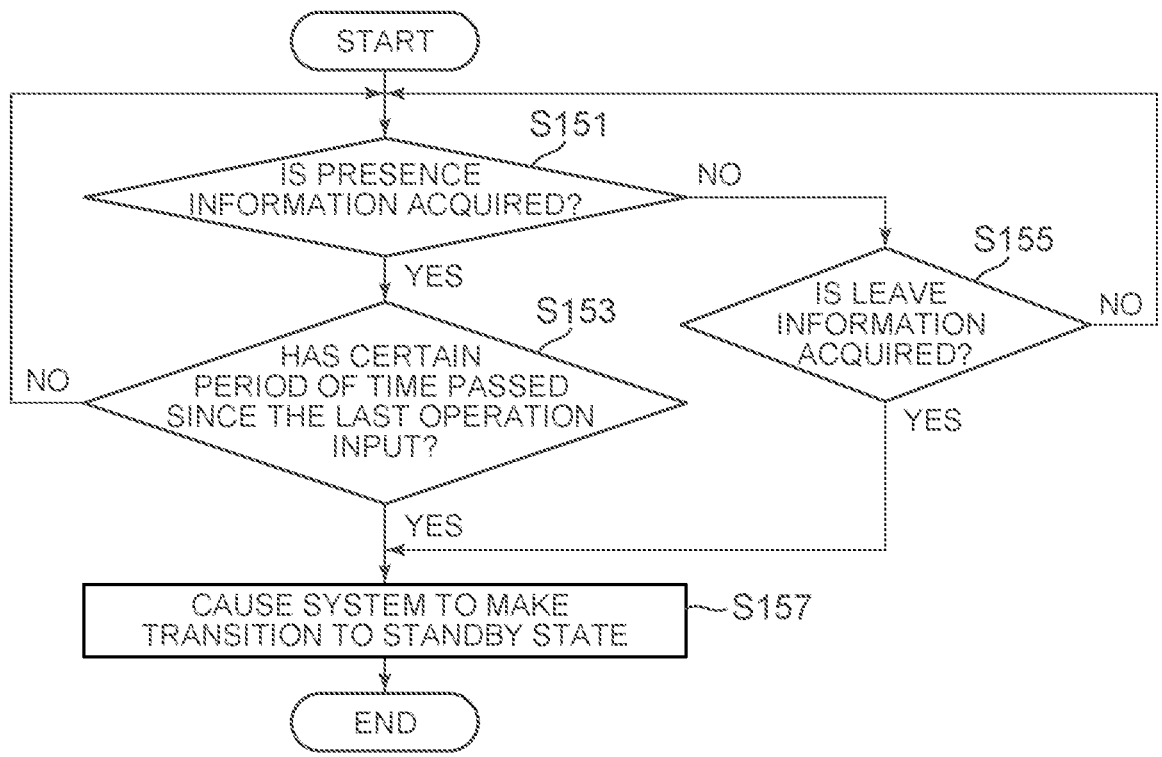
FIG. 9 is a flowchart illustrating an example of sleep processing according to one or more embodiments.

Referring next to FIG. 9, the operation of sleep processing executed by the CPU 302 (sleep control unit 323) in the normal operating state will be described. FIG. 9 is a flowchart illustrating an example of sleep processing according to one or more embodiments.

(Step S151) The CPU 302 determines whether or not to acquire the Presence information from the EC 200. When determining that the Presence information is acquired (YES), the CPU 302 proceeds to a process in step S153. On the other hand, when determining that the Presence information is not acquired (NO), the CPU 302 proceeds to a process in step S155.

(Step S153) The CPU 302 determines whether or not a certain period of time has passed since the last operation input by the user while the Presence information is being acquired. For example, the CPU 302 determines whether or not the elapsed time since the last operation input by the user reaches a preset sleep time (for example, 5 minutes) to determine whether or not the certain period of time has passed since the last operation input by the user. When determining that the certain period of time has not passed since the last operation input by the user (NO), the CPU 302 returns to the process in step S151. On the other hand, when determining that the certain period of time has passed since the last operation input by the user (YES), the CPU 302 determines that there is no operation input by the user over the certain period of time, and causes the system to make the transition from the normal operating state to the standby state (step S157).

(Step S155) The CPU 302 determines whether or not the Leave information is acquired from the EC 200. When determining that the Leave information is not acquired (NO), the CPU 302 returns to the process in step S151. On the other hand, when determining that the Leave information is acquired (YES), the CPU 302 causes the system to make the transition from the normal operating state to the standby state (step S157).

Note that, in step S155, when continuously acquiring the Leave information from the EC 200 over the certain period of time (for example, 30 seconds), the CPU 302 may also cause the system to make the transition from the normal operating state to the standby state.

Summary of First Embodiment

As described above, the electronic apparatus 1 according to one or more embodiments includes the system memory 310 (an example of a memory), the CPU 302 (an example of a first processor), the face detection unit 210 (an example of a second processor), and the EC 200 (an example of a third processor). The system memory 310 temporarily stores a program of an OS (an example of a system). The CPU 302 executes the OS program stored in the system memory 310 to implement the functions of the system. The face detection unit 210 detects a face area with a face captured therein from an image (captured image) captured with the camera 120 (an example of an imaging unit). When the face area is detected from the captured image by the face detection unit 210, the EC 200 outputs the Presence information (an example of first information), while when no face area is detected, the EC 200 switches between and executes the face detection enabled mode (an example of first processing) to output the Leave information (an example of second information), and the face detection disabled mode (an example of second processing) to output the Presence information despite the detection of the face area. Then, when there is no operation input by the user over the certain period of time, the CPU 302 restricts use of at least some of the functions of the system (for example, makes the transition to the standby state), and when the Leave information is acquired from the EC 200, the CPU 302 restricts use of at least some of the functions of the system (for example, makes the transition to the standby state) without waiting for the certain period of time.

Thus, since the electronic apparatus 1 can switch between and execute the face detection enabled mode to cause the system to make the transition to the standby state according to the face detection, and the face detection disabled mode to cause the system to make the transition to the standby state when there is no operation input by the user over the certain period of time despite the face detection, the electronic apparatus 1 can control the operating state properly according to the usage situation.

For example, based on the captured image captured with the camera 120, the face detection unit 210 determines whether or not the imaging direction of the camera 120 is blocked. When the imaging direction of the camera 120 is determined by the face detection unit 210 not to be blocked, the EC 200 executes the face detection enabled mode, while when the imaging direction of the camera 120 is determined to be blocked, the EC 200 executes the face detection disabled mode.

Thus, in the state where the camera cover 120S is open, when no face area is detected from the captured image captured with the camera 120, the electronic apparatus 1 can cause the system to make the transition from the normal operating state to the standby state, while when any face area is no longer detected from the captured image by closing the camera cover 120S, the electronic apparatus 1 can continue the normal operating state without causing the system to make the transition to the standby state. Therefore, the electronic apparatus 1 can control the operating state properly according to the usage situation.

Although a part that detects whether the camera cover 120S is open or closed may be added, the addition not only increases the cost, but also the part cannot detect whether or not the camera 120 is covered by hand. According to one or more embodiments, since there is no need to add the part that detects the state of the camera cover 120S, the cost can be reduced. Further, according to one or more embodiments, the operating state can be controlled properly depending on not only the state of the camera cover 120S but also whether or not the camera 120 is covered by hand.

Further, the EC 200 repeatedly executes the face detection enabled mode or the face detection disabled mode in such a manner that the cycle of repeatedly executing the face detection disabled mode is set longer than the cycle of repeatedly executing the face detection enabled mode.

Thus, in the face detection disabled mode, the electronic apparatus 1 can reduce power consumption more than that in the face detection enabled mode.

Further, a control method for the electronic apparatus 1 according to one or more embodiments includes: a step of causing the face detection unit 210 (the example of the second processor) to detect a face area with a face captured therein from an image (captured image) captured with the camera 120 (the example of the imaging unit); a step in which when the face area is detected from the captured image by the face detection unit 210, the EC 200 (the example of the third processor) outputs the Presence information (the example of the first information), while when no face area is detected, the EC 200 switches between and executes the face detection enabled mode (the example of the first processing) to output the Leave information (the example of the second information), and the face detection disabled mode (the example of the second processing) to output the Presence information despite the detection of the face area by the face detection unit 210; a step in which when there is no operation input by the user over the certain period of time, the CPU 302 (the example of the first processor) restricts use of at least some of the functions of the system (for example, makes the transition to the standby state); and a step in which when the Leave information is acquired from the EC 200, the CPU 302 restricts use of at least some of the functions of the system (for example, makes the transition to the standby state) without waiting for the certain period of time.

Thus, since the electronic apparatus 1 can switch between and execute the face detection enabled mode to cause the system to make the transition to the standby state depending on the face detection, and the face detection disabled mode to cause the system to make the transition to the standby state despite the face detection when there is no operation input by the user over the certain period of time, the electronic apparatus 1 can control the operating state properly according to the usage situation.

Second Embodiment

Next, a second embodiment of the present invention will be described.

In the above described embodiments, the example of switching between the face detection enabled mode and the face detection disabled mode depending on whether or not the imaging direction of the camera 120 is blocked in the normal operating state is described. In contrast, in one or more embodiments, an example of switching between the face detection enabled mode and the face detection disabled mode according to the open angle θ between the first chassis 10 and the second chassis 20 in the normal operating state will be described.

Depending on the open angle θ between the first chassis 10 and the second chassis 20, the user's face may not fit in the angle of view of the camera 120. Therefore, in one or more embodiments, when the open angle θ between the first chassis 10 and the second chassis 20 is within a predetermined range (for example, 70° to 135°), the face detection enabled mode is set, while when the open angle θ is out of the predetermined range, the face detection disabled mode is set.

Figure 10:
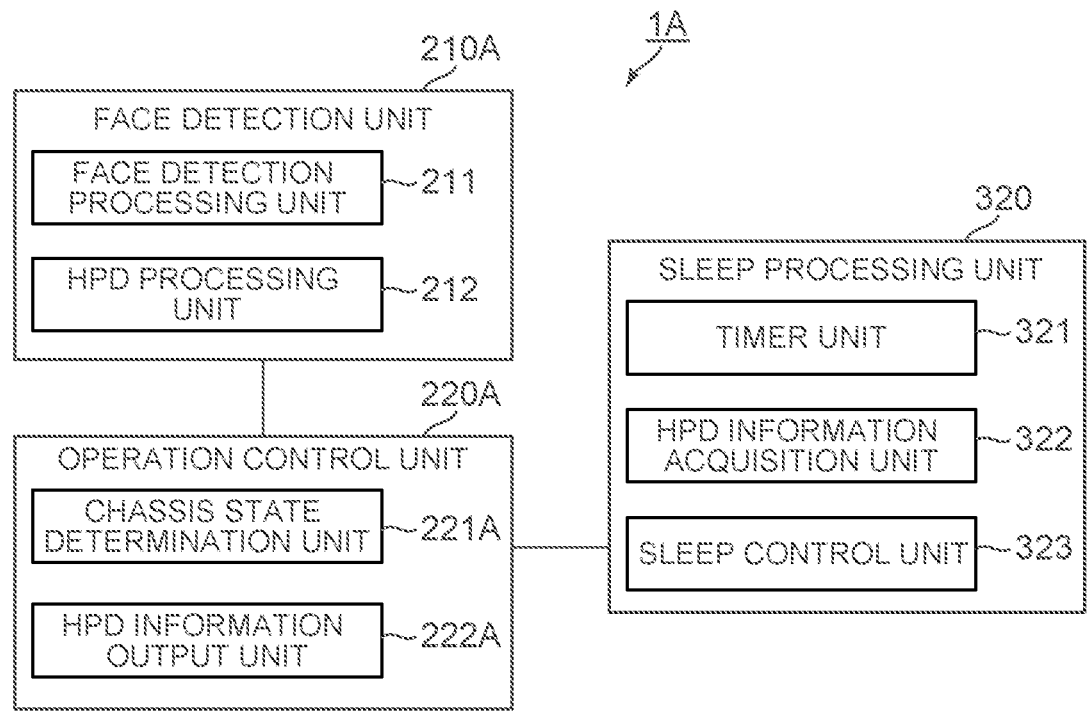
FIG. 10 is a block diagram illustrating an example of the functional configuration of an electronic apparatus according to one or more embodiments.

FIG. 10 is a block diagram illustrating an example of the functional configuration of an electronic apparatus 1A according to one or more embodiments. Note that the appearance configuration and hardware configuration of the electronic apparatus 1A are the same as the appearance configuration and hardware configuration of the electronic apparatus 1 according to the above described embodiments illustrated in FIG. 2 and FIG. 6.

The electronic apparatus 1A illustrated in FIG. 10 includes a face detection unit 210A, an operation control unit 220A, and the sleep processing unit 320. The face detection unit 210A corresponds to the face detection unit 210 illustrated in FIG. 6, which includes the face detection processing unit 211 and the HPD processing unit 212. The face detection processing unit 211 and the HPD processing unit 212 are the same components as the face detection processing unit 211 and the HPD processing unit 212 according to the above described embodiments illustrated in FIG. 7.

The operation control unit 220A is a functional component implemented by the EC 200 illustrated in FIG. 6 executing a control program, which includes a chassis state determination unit 221A and an HPD information output unit 222A.

Based on the detection result of the acceleration sensor 130, the chassis state determination unit 221A detects the open angle θ (rotation angle) when the first chassis 10 and the second chassis 20 are rotated relative to each other, and determines whether or not the detected open angle θ is within the predetermined range (for example, 70° to 135°).

Based on the determination result by the chassis state determination unit 221A, the HPD information output unit 222A switches between and executes the face detection enabled mode and the face detection disabled mode in the normal operating state. For example, when it is determined by the chassis state determination unit 221A that the open angle θ between the first chassis 10 and the second chassis 20 is within the predetermined range, the HPD information output unit 222A executes the face detection enabled mode.

On the other hand, when it is determined by the chassis state determination unit 221A that the open angle θ between the first chassis 10 and the second chassis 20 is out of the predetermined range, the HPD information output unit 222A executes the face detection disabled mode.

In the face detection enabled mode, when acquiring the Presence information from the face detection unit 210A, the HPD information output unit 222A outputs the Presence information as HPD information to the system processing unit 300, while when acquiring the Leave information from the face detection unit 210A, the HPD information output unit 222A outputs the Leave information as HPD information to the system processing unit 300. In other word, in the face detection enabled mode, the HPD information output unit 222A outputs the Presence information when a face area is detected from a captured image by the face detection unit 210A, and outputs the Leave information when no face area is detected.

On the other hand, in the face detection disabled mode, the HPD information output unit 222A outputs the Presence information to the system processing unit 300 regardless of the output of HPD information from the face detection unit 210A. In other word, in the face detection disabled mode, the HPD information output unit 222A outputs the Presence information despite the detection of the face area from the captured image.

The sleep processing unit 320 is a functional component implemented by the system processing unit 300 illustrated in FIG. 6 executing an OS program, which is the same as the sleep processing unit 320 according to the above described embodiments illustrated in FIG. 7.

Thus, in the case where the open angle θ between the first chassis 10 and the second chassis 20 is within the predetermined range, when any face area is no longer detected from the captured image, the electronic apparatus 1A can cause the system to make the transition from the normal operating state to the standby state, while when any face area is no longer detected from the captured image as a result of the fact that the open angle θ between the first chassis 10 and the second chassis 20 becomes out of the predetermined range, the electronic apparatus 1A can continue the normal operating state without causing the system to make the transition to the standby state.

Figure 11:
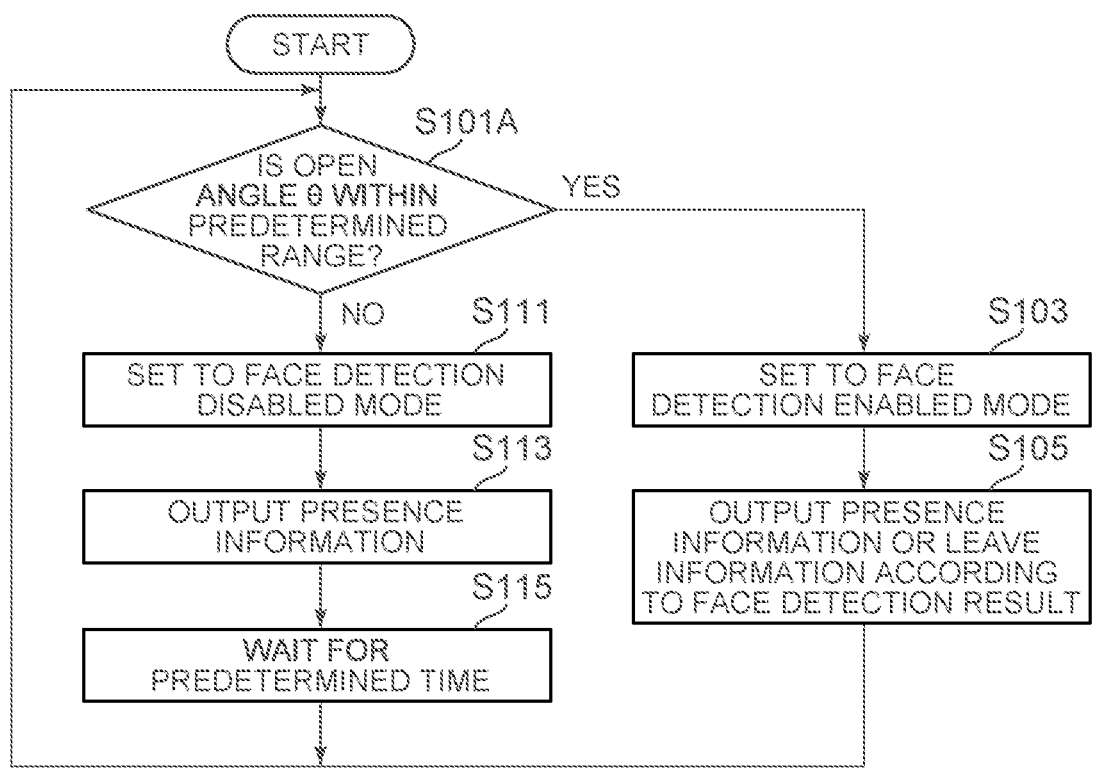
FIG. 11 is a flowchart illustrating an example of HPD processing according to one or more embodiments.

Referring next to FIG. 11, the operation of HPD processing in which the EC 200 (operation control unit 220A) according to one or more embodiments outputs HPD information by switching between the face detection enabled mode and the face detection disabled mode in the normal operating state will be described.

FIG. 11 is a flowchart illustrating an example of HPD processing according to one or more embodiments. In FIG. 11, the same step numbers are given to steps corresponding to respective processes illustrated in FIG. 8 to omit the description thereof. In the HPD processing illustrated in FIG. 11, only a process in step S101A is different from that in the HPD processing illustrated in FIG. 8.

(Step S101A) Based on the detection result of the acceleration sensor 130, the EC 200 detects the open angle θ (rotation angle) when the first chassis 10 and the second chassis 20 are rotated relative to each other, and determines whether or not the detected open angle θ is within the predetermined range (for example, 70° to 135°). When determining that the open angle θ is within the predetermined range (YES), the EC 200 sets the mode to the face detection enabled mode (step S103). On the other hand, when determining that the open angle θ is out of the predetermined range (NO), the EC 200 sets the mode to the face detection disabled mode (step S111). Subsequent processing is the same as the processing illustrated in FIG. 8.

Note that the operation of sleep processing according to one or more embodiments is the same as the operation of the sleep processing according to the above described embodiments described with reference to FIG. 9, and the description thereof will be omitted.

Summary of Second Embodiment

As described above, the electronic apparatus 1A according to one or more embodiments includes the first chassis 10 having at least the camera 120 (the example of the imaging unit), the second chassis 20 having at least the input device 150 (an example of an input unit), and the hinge mechanism 15 (an example of a rotating mechanism) which connects the first chassis 10 and the second chassis 20 in a manner to be rotatable relative to each other. When the open angle θ (rotation angle) between the first chassis 10 and the second chassis 20 rotated relative to each other is within the predetermined range, the EC 200 (the example of the third processor) executes the face detection enabled mode (the example of the first processing), while when the open angle θ is out of the predetermined range, the EC 200 executes the face detection disabled mode (the example of the second processing).

Thus, in the case where the open angle θ between the first chassis 10 and the second chassis 20 is within the predetermined range, when any face area is no longer detected from the captured image captured with the camera 120, the electronic apparatus 1A can cause the system to make the transition from the normal operating state to the standby state, while when any face area is no longer detected from the captured image as a result of the fact that the open angle θ between the first chassis 10 and the second chassis 20 becomes out of the predetermined range, the electronic apparatus 1A can continue the normal operating state without causing the system to make the transition to the standby state. Therefore, the electronic apparatus 1A can control the operating state properly according to the usage situation.

Third Embodiment

Next, a third embodiment of the present invention will be described.

In one or more embodiments, an example of switching between the face detection enabled mode and the face detection disabled mode depending on whether or not an external display is used in the normal operating state will be described.

Figure 12:
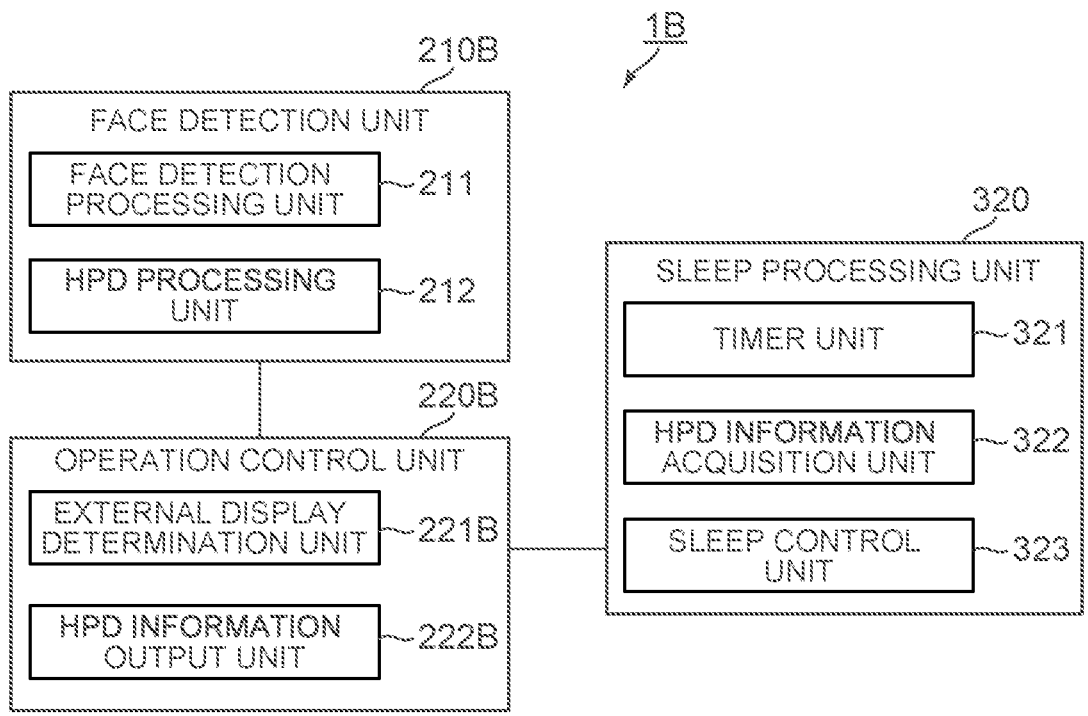
FIG. 12 is a block diagram illustrating an example of the functional configuration of an electronic apparatus according to one or more embodiments.

FIG. 12 is a block diagram illustrating an example of the functional configuration of an electronic apparatus 1B according to one or more embodiments. Note that the appearance configuration and hardware configuration of the electronic apparatus 1B are the same as the appearance configuration and hardware configuration of the electronic apparatus 1 according to the above described embodiments illustrated in FIG. 2 and FIG. 6.

The electronic apparatus 1B includes the video output terminal 160 (see FIG. 6) as an output interface to output display image data for displaying a display image on an external display. The electronic apparatus 1B outputs display image data to the external display (external display device) connected to the video output terminal 160 to display the display image. The electronic apparatus 1B may also use the communication unit 350 (see FIG. 6) as an output interface to output display image data to the external display by wireless communication such as Wi-Fi (registered trademark) to display the display image.

Since the user using the electronic apparatus 1B while displaying the display image on the external display is likely not to face the electronic apparatus 1B, the electronic apparatus 1B becomes difficult to detect a face area due to the fact that no user's face is in a captured image captured with the camera 120 or the fact that it is a profile even when the user's face is captured. Therefore, in one or more embodiments, the electronic apparatus 1B sets the face detection enabled mode when no display image is displayed on the external display, and sets the face detection disabled mode when the display image is displayed on the external display.

The electronic apparatus 1B illustrated in FIG. 12 includes a face detection unit 210B, an operation control unit 220B, and the sleep processing unit 320. The face detection unit 210B corresponds to the face detection unit 210 illustrated in FIG. 6, which includes the face detection processing unit 211 and the HPD processing unit 212. The face detection processing unit 211 and the HPD processing unit 212 are the same components as the face detection processing unit 211 and the HPD processing unit 212 according to the above described embodiments illustrated in FIG. 7.

The operation control unit 220B is a functional component implemented by the EC 200 illustrated in FIG. 6 executing a control program, which includes an external display determination unit 221B and an HPD information output unit 222B.

The external display determination unit 221B determines whether or not a display image of the electronic apparatus 1B is being displayed on the external display. The display image of the electronic apparatus 1B is a display image based on the system functions executed by the CPU 302, which corresponds to a display image displayed on the display unit 110. For example, when the external display is connected by the OS display settings, it can be set that the display image is displayed on either (or both) of the display unit 110 (internal display) and the external display. For example, the external display determination unit 221B acquires setting information of the OS display settings to determine whether or not the display image of the electronic apparatus 1B is being displayed on the external display.

Based on the determination result by the external display determination unit 221B, the HPD information output unit 222B switches between and executes the face detection enabled mode and the face detection disabled mode in the normal operating state. For example, when it is determined by the external display determination unit 221B that the display image of the electronic apparatus 1B is not displayed on the external display, the HPD information output unit 222B executes the face detection enabled mode. On the other hand, when it is determined that the display image of the electronic apparatus 1B is being displayed on the external display, the HPD information output unit 222B executes the face detection disabled mode.

In the face detection enabled mode, when acquiring the Presence information from the face detection unit 210B, the HPD information output unit 222B outputs the Presence information to the system processing unit 300 as HPD information, while when acquiring the Leave information from the face detection unit 210B, the HPD information output unit 222B outputs the Leave information to the system processing unit 300 as HPD information. In other word, in the face detection enabled mode, when a face area is detected from a captured image by the face detection unit 210B, the HPD information output unit 222B outputs the Presence information, while when no face area is detected, the HPD information output unit 222B outputs the Leave information.

On the other hand, in the face detection disabled mode, the HPD information output unit 222B outputs the Presence information to the system processing unit 300 regardless of the output of HPD information from the face detection unit 210B. In other word, in the face detection disabled mode, the HPD information output unit 222B outputs the Presence information despite the detection of the face area from the captured image.

The sleep processing unit 320 is a functional component implemented by the system processing unit 300 illustrated in FIG. 6 executing an OS program, which is the same as the sleep processing unit 320 according to the above described embodiments illustrated in FIG. 7.

Thus, in the case where the display image of the electronic apparatus 1B is not displayed on the external display (that is, it is displayed on the display unit 110), when any face area is no longer detected from the captured image, the electronic apparatus 1B can cause the system to make the transition from the normal operating state to the standby state, while when any face area is no longer detected from the captured image as a result of the fact that the display image of the electronic apparatus 1B is displayed on the external display, the electronic apparatus 1B can continue the normal operating state without causing the system to make the transition to the standby state.

Figure 13:
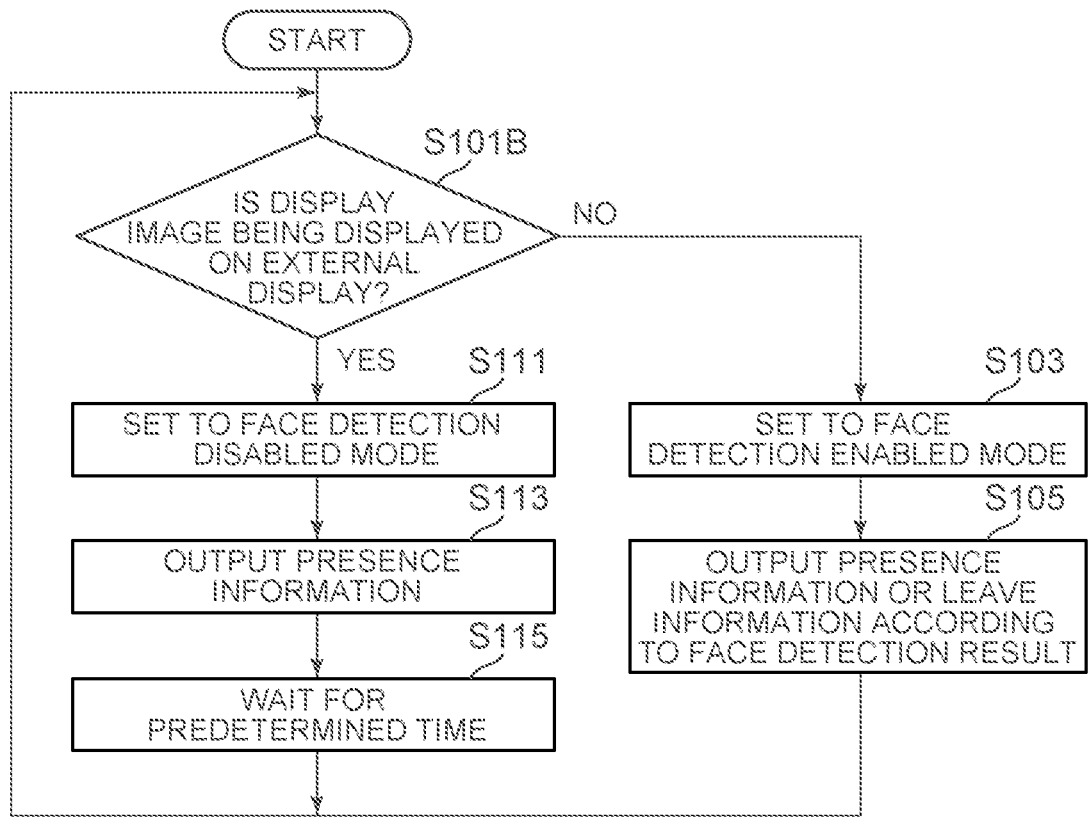
FIG. 13 is a flowchart illustrating an example of HPD processing according to one or more embodiments.

Referring next to FIG. 13, the operation of HPD processing in which the EC 200 (operation control unit 220B) according to one or more embodiments outputs HPD information by switching between the face detection enabled mode and the face detection disabled mode in the normal operating state will be described.

FIG. 13 is a flowchart illustrating an example of HPD processing according to one or more embodiments. In FIG. 13, the same step numbers are given to steps corresponding to respective processes illustrated in FIG. 8 to omit the description thereof. In the HPD processing illustrated in FIG. 13, only a process in step S101B is different from that in the HPD processing illustrated in FIG. 8.

(Step S101B) Based on the setting information of the OS display settings, the EC 200 determines whether or not the display image of the electronic apparatus 1B is being displayed on the external display. When determining that the display image is not displayed on the external display (NO), the EC 200 sets the mode to the face detection enabled mode (step S103). On the other hand, when determining that the display image is being displayed on the external display (YES), the EC 200 sets the mode to the face detection disabled mode (step S111). Subsequent processing is the same as the processing illustrated in FIG. 8.

Note that the operation of sleep processing according to one or more embodiments is the same as the operation of the sleep processing according to the above described embodiments described with reference to FIG. 9, and the description thereof will be omitted.

Summary of Third Embodiment

As described above, the electronic apparatus 1B according to one or more embodiments includes the video output terminal 160 (an example of an output interface) to output display image data for displaying a display image based on the system functions on the external display. In the state where the display image is not displayed on the external display, the EC 200 (the example of the third processor)

executes the face detection enabled mode (the example of the first processing), while in the state where the display image is being displayed on the external display, the EC 200 executes the face detection disabled mode (the example of the second processing).

Thus, in the case where the display image of the electronic apparatus 1B is not displayed on the external display (that is, it is displayed on the display unit 110), when any face area is no longer detected from a captured image captured with the camera 120, the electronic apparatus 1B can cause the system to make the transition from the normal operating state to the standby state, while when any face area is no longer detected from the captured image as a result of the fact that the display image of the electronic apparatus 1B is displayed on the external display, the electronic apparatus 1B can continue the normal operating state without causing the system to make the transition to the standby state. Therefore, the electronic apparatus 1B can control the operating state properly according to the usage situation.

While the respective embodiments of this invention have been described in detail above with reference to the accompanying drawings, the specific configurations are not limited to the above-described embodiments, and design changes are included without departing from the scope of this invention. For example, the respective configurations described above in the respective embodiments can be combined arbitrarily.

In the aforementioned embodiments, the face detection unit 210, 210A, 210B detects a face area with a face captured therein from a captured image captured with the camera 120. However, when the face area is detected, a line of sight from the eyes of the face included in the face area may also be detected. Then, in the face detection enabled mode (the example of the first processing), when the face area is detected from the captured image captured with the camera 120 and the line-of-sight direction is within a predetermined range, the EC 200 (operation control unit 220, 220A, 220B) may output the Presence information (the example of the first information), while when the face area is detected and the line-of-sight direction is out of the predetermined range, or when no face area is detected, the EC 200 (operation control unit 220, 220A, 220B) may output the Leave information (the example of the second information). Here, the above-mentioned predetermined range in the line-of-sight direction is preset as a range within which it can be determined that the user is looking toward the electronic apparatus 1, 1A, 1B (that is, the user is using the electronic apparatus 1, 1A, 1B). In other word, the electronic apparatus 1, 1A, 1B may also control the system operating state in the face detection enabled mode depending on not only the presence or absence of the user (the presence or absence of the face area detection) but also whether or not the direction of the user's line of sight is within the predetermined range. On the other hand, in the face detection disabled mode (the example of the second processing), the electronic apparatus 1, 1A, 1B outputs the Presence information (the example of the first information) despite the detection of the face area and the line-of-sight direction. Thus, even when the system operating state is controlled depending on not only the presence or absence of the user (the presence or absence of the face area detection) but also whether or not the direction of the user's line of sight is within the predetermined range, the configuration to switch between and execute the face detection enabled mode and the face detection disabled mode in each of the embodiments described above can be applied.

Further, in the aforementioned embodiments, the configuration example in which the camera 120 is built in the electronic apparatus 1 (1A, 1B) is described, but the present invention is not limited to this example. For example, the camera 120 does not have to be built in the electronic apparatus 1 (1A, 1B), which may also be attachable to the electronic apparatus 1 (1A, 1B) (for example, onto any of the side faces 10a, 10b, 10c, and the like) and communicably connected to the electronic apparatus 1 (1A, 1B) wirelessly or by wire as an external accessory.

Further, in the aforementioned embodiments, the electronic apparatus 1 (1A, 1B) detects a face area with a face captured therein from a captured image to detect the presence of the user, but an area to be detected is not limited to the face area with the face captured therein, and the presence of the user may also be detected by detecting an area in which at least part of the body is captured. Further, the electronic apparatus 1 (1A, 1B) may use a distance sensor (for example, a proximity sensor or the like) together to detect the distance to an object. For example, the distance sensor is provided on the inner face side of the first chassis 10 to detect an object (for example, a person) present within a detection range in a direction (forward) to face the inner face of the first chassis 10. As an example, the distance sensor may be an infrared distance sensor configured to include a light-emitting part for emitting infrared light and a light-receiving part for receiving reflected light which is the infrared light returned after being emitted and reflected on the surface of the object. Note that the distance sensor may be a sensor using infrared light emitted by a light-emitting diode, or a sensor using an infrared laser emitting a light beam narrower in wavelength band than the infrared light emitted by the light-emitting diode. Further, the distance sensor is not limited to the infrared distance sensor, and it may be a sensor using any other method, such as an ultrasonic sensor or a sensor using a UWB (Ultra Wide Band) radar, as long as the sensor detects the distance to the object. Further, the distance sensor does not have to be built in the electronic apparatus 1 (1A, 1B), which may also be attachable to the electronic apparatus 1 (1A, 1B) (for example, onto any of the side faces 10a, 10b, 10c, and the like) and communicably connected to the electronic apparatus 1 (1A, 1B) wirelessly or by wire as an external accessory. Further, the camera 120 and the distance sensor may be integrally constructed.

Further, in the aforementioned embodiments, the example in which the face detection unit 210 (210A, 210B) is provided separately from the EC 200 is illustrated, but some or all of the functions of the face detection unit 210 (210A, 210B) may be provided in the EC 200, or some or all of the functions of the face detection unit 210 (210A, 210B) and the EC 200 may be configured as one package. Further, some or all of the functions of the face detection unit 210 (210A, 210B) may be provided in the system processing unit 300, or some or all of the functions of the face detection unit 210 (210A, 210B) and some or all of the functions of the system processing unit 300 may be configured as one package. Further, some or all of the functions of the operation control unit 220 (220A, 220B) may be implemented as a functional component of any processing unit other than the EC 200 (for example, of the system processing unit 300).

Note that the electronic apparatus 1 (1A, 1B) described above has a computer system therein. Then, a program for implementing the function of each component included in the electronic apparatus 1 (1A, 1B) described above may be recorded on a computer-readable recording medium so that the program recorded on this recording medium is read into the computer system and executed to perform processing in each component included in the electronic apparatus 1 (1A, 1B) described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a portable medium like a flash ROM or a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the electronic apparatus 1 (1A, 1B), or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the electronic apparatus 1 (1A, 1B) in the above-described embodiments may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Note that the electronic apparatus 1 (1A, 1B) is not limited to the laptop PC, and it may also be a desktop PC, a tablet terminal device, or a smartphone. Further, the electronic apparatus 1 (1A, 1B) is not limited to the PC, the tablet terminal device, the smartphone, or the like, and the present invention can also be applied to a household electric appliance or a commercial electric appliance. As the household electric appliance, the present invention can be applied to a TV set, a refrigerator or a microwave oven having a display unit, or the like. For example, ON/OFF of a TV screen or ON/OFF of a screen of the display unit of the refrigerator or the microwave oven can be controlled in response to the approach or leave of a person. As the commercial electric appliance, the present invention can be applied to a vending machine, a multimedia station, or the like. For example, an operating state such as ON/OFF of lighting of the vending machine or ON/OFF of a screen of a display unit of the multimedia station can be controlled in response to the approach or leave of a person.

DESCRIPTION OF SYMBOLS 1, 1A, 1B electronic apparatus
10 first chassis
20 second chassis
15 hinge mechanism
110 display unit
120 camera (imaging unit)
130 acceleration sensor
140 power button
150 input device
151 keyboard
153 touch pad
160 video output terminal
200 EC
210, 210A, 210B face detection unit
211 face detection processing unit
212 HPD processing unit
213 camera state determination unit
220, 220A, 220B operation control unit
221A chassis state determination unit
221B external display determination unit
222, 222A, 222B HPD information output unit
300 system processing unit
302 CPU
304 GPU
306 memory controller
308 I/O controller
310 system memory
320 sleep processing unit
321 timer unit
322 HPD information acquisition unit
323 sleep control unit
350 communication unit
360 storage unit
400 power supply unit

What is claimed is:

1. An electronic apparatus comprising:
a memory which temporarily stores a program of a system;
a first processor which executes the program to implement functions of the system;
a second processor which detects a face area with a face captured therein from an image captured by an imaging unit; and
a third processor which switches between and executes
a first processing mode in which, when the face area is detected by the second processor, first information is output, while when the face area is not detected, second information is output, and
a second processing mode to output the first information regardless of whether the face area is detected by the second processor,
wherein the third processor switches between the first processing mode and the second processing mode based on a usage situation of the electronic apparatus,
wherein
when there is no operation input by a user over a certain period of time, the first processor restricts use of at least some of the functions of the system, and
when acquiring the second information from the third processor, the first processor restricts use of at least some of the functions of the system without waiting for the certain period of time.

2. The electronic apparatus according to claim 1, wherein the second processor determines whether or not an imaging direction of the imaging unit is blocked based on the image captured by the imaging unit, and
the usage situation is based on whether or not an imaging direction of the imaging unit is blocked, when it is determined by the second processor that the imaging direction of the imaging unit is not blocked, the third processor executes the first processing mode, while when it is determined that the imaging direction of the imaging unit is blocked, the third processor executes the second processing mode.

3. The electronic apparatus according to claim 1, further comprising:
a first chassis having at least the imaging unit;
a second chassis having at least an input unit; and
a rotating mechanism which connects the first chassis and the second chassis in a manner to be rotatable relative to each other,
wherein the usage situation is based on a rotation angle of the first chassis relative to the second chassis,
wherein in a case where the rotation angle when the first chassis and the second chassis are rotated relative to each other is within a predetermined range, the third processor executes the first processing mode, while when the rotation angle is out of the predetermined range, the third processor executes the second processing mode.

4. The electronic apparatus according to claim 1, further comprising
an output interface which outputs display image data for displaying a display image based on the functions of the system on an external display,
wherein the usage situation is based on whether or not the external display displays the display image,
wherein in a state where the display image is not displayed on the external display, the third processor executes the first processing mode, while in a state where the display image is being displayed on the external display, the third processor executes the second processing mode.

5. The electronic apparatus according to claim 1, wherein the third processor repeatedly executes the first processing mode or the second processing mode in such a manner that a cycle of repeatedly executing the second processing mode is set longer than a cycle of repeatedly executing the first processing mode.

6. An electronic apparatus comprising:
a memory which temporarily stores a program of a system;
a first processor which executes the program to implement functions of the system;
a second processor which detects a face area with a face captured therein from an image captured by an imaging unit, and when detecting the face area, which detects a direction of a line of sight from eyes of the face included in the face area; and
a third processor which
outputs first information when the face area is detected by the second processor and the direction of the line of sight is within a predetermined range, or
switches between and executes
first processing mode to output second information when the face area is detected and the direction of the line of sight is out of the predetermined range or when the face area is not detected, and
second processing mode to output the first information despite the detection of the face area and the direction of the line of sight by the second processor,
wherein the third processor switches between the first processing mode and the second processing mode based on a usage situation of the electronic apparatus,
wherein
when there is no operation input by a user over a certain period of time, the first processor restricts use of at least some of the functions of the system, and
when acquiring the second information from the third processor, the first processor restricts use of at least some of the functions of the system without waiting for the certain period of time.

7. A control method for an electronic apparatus including: a memory which temporarily stores a program of a system; a first processor which executes the program to implement functions of the system; a second processor; and a third processor, the control method comprising:
a step of causing the second processor to detect a face area with a face captured therein from an image captured by an imaging unit;
a step in which when the face area is detected by the second processor, the third processor outputs first information, while when the face area is not detected, the third processor switches between and executes
a first processing mode to output second information and
a second processing mode to output the first information despite detection of regardless of whether the face area is detected by the second processor,
wherein the third processor switches between the first processing mode and the second processing mode based on a usage situation of the electronic apparatus;
a step in which when there is no operation input by a user over a certain period of time, the first processor restricts use of at least some of the functions of the system; and
a step in which when the second information is acquired from the third processor, the first processor restricts use of at least some of the functions of the system without waiting for the certain period of time.

8. A control method for an electronic apparatus including: a memory which temporarily stores a program of a system; and a first processor, a second processor, and a third processor which implement functions of the system by executing the program, the control method comprising:
a step of causing the second processor to detect a face area with a face captured therein from an image captured by an imaging unit, and when detecting the face area, causing the second processor to detect a line-of-sight direction from eyes of the face included in the face area;
a step in which when the face area is detected by the second processor and the line-of-sight direction is within a predetermined range, the third processor outputs first information, while when the face area is detected but the line-of-sight direction is out of the predetermined range, or when the face area is not detected, the third processor switches between and executes
a first processing mode to output second information and P2 a second processing mode to output the first information despite detection of the face area and the line-of-sight direction by the second processor,
wherein the third processor switches between the first processing mode and the second processing mode based on a usage situation of the electronic apparatus;

a step in which when there is no operation input by a user over a certain period of time, the first processor restricts use of at least some of the functions of the system; and a step in which when the second information is acquired from the third processor, the first processor restricts use of at least some of the functions of the system without waiting for the certain period of time.

\* \* \* \* \*